(12) United States Patent
Inoue et al.

(10) Patent No.: US 9,829,043 B2
(45) Date of Patent: Nov. 28, 2017

(54) SLIDING PARTS

(71) Applicant: EAGLE INDUSTRY CO., LTD., Tokyo (JP)

(72) Inventors: Hideyuki Inoue, Tokyo (JP); Yuta Negishi, Tokyo (JP); Takeshi Hosoe, Tokyo (JP); Yuuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 14/900,064

(22) PCT Filed: Sep. 3, 2014

(86) PCT No.: PCT/JP2014/073136
§ 371 (c)(1),
(2) Date: Dec. 18, 2015

(87) PCT Pub. No.: WO2015/041048
PCT Pub. Date: Mar. 26, 2015

(65) Prior Publication Data
US 2016/0195139 A1 Jul. 7, 2016

(30) Foreign Application Priority Data

Sep. 18, 2013 (JP) ................................. 2013-192868

(51) Int. Cl.
*F16J 15/32* (2016.01)
*F16C 33/74* (2006.01)
(Continued)

(52) U.S. Cl.
CPC .............. *F16C 33/74* (2013.01); *F16C 17/02* (2013.01); *F16C 33/107* (2013.01);
(Continued)

(58) Field of Classification Search
CPC .......... F16J 15/16; F16J 15/162; F16J 15/182; F16J 15/324; F16J 15/3244
See application file for complete search history.

(56) References Cited

U.S. PATENT DOCUMENTS 5,044,642 A * 9/1991 Vogt ....................... F16J 15/324
277/559
7,997,583 B2 8/2011 Nakahara ...................... 277/390
(Continued)

FOREIGN PATENT DOCUMENTS

| CN | 101305225 | 11/2008 | ............... F16J 15/34 |
| CN | 101861485 | 10/2010 | ............... F16J 15/34 |

(Continued)

OTHER PUBLICATIONS

International Preliminary Report on Patentability issued in application No. PCT/JP2014/073136, dated Mar. 31, 2016 (5 pgs).
(Continued)

*Primary Examiner* — Gilbert Lee
(74) *Attorney, Agent, or Firm* — Hayes Soloway P.C.

(57) ABSTRACT

By randomly arranging dimples provided on a sealing face, a sliding characteristic is improved in a wide range of a bearing characteristic number on the sealing face. A pair of sliding parts in which a plurality of dimples is arranged on at least one of sealing faces that relatively slide on each other is characterized in that each of the plurality of dimples is provided independently from the other dimples, and arranged in such a manner that the plurality of dimples having different opening diameters is randomly distributed.

9 Claims, 5 Drawing Sheets

(51) Int. Cl.
*F16J 15/34* (2006.01)
*F16C 17/02* (2006.01)
*F16C 33/10* (2006.01)

(52) U.S. Cl.
CPC ....... *F16J 15/3412* (2013.01); *F16J 15/3424* (2013.01); *F16C 2240/44* (2013.01)

(56) References Cited

U.S. PATENT DOCUMENTS

| | | | | |
|---|---|---|---|---|
| 8,585,060 | B2 | 11/2013 | Oshii et al. | 277/401 |
| 2002/0090155 | A1* | 7/2002 | Ushijima | F02F 1/20 384/293 |
| 2003/0178781 | A1* | 9/2003 | Tejima | F16J 15/3424 277/399 |
| 2003/0189294 | A1* | 10/2003 | Tejima | F16J 15/3424 277/399 |
| 2004/0080112 | A1* | 4/2004 | Tejima | F16J 15/3436 277/306 |
| 2005/0212217 | A1* | 9/2005 | Tejima | F16J 15/3412 277/399 |
| 2011/0215531 | A1* | 9/2011 | Tokunaga | F16J 15/3412 277/399 |
| 2011/0233872 | A1* | 9/2011 | Iguchi | F16J 15/3412 277/400 |
| 2014/0167362 | A1* | 6/2014 | Hosoe | F16J 15/3244 277/400 |
| 2014/0219588 | A1* | 8/2014 | McCulfor | F16J 15/16 384/26 |
| 2015/0014937 | A1* | 1/2015 | Behrman | F16J 15/3244 277/351 |

FOREIGN PATENT DOCUMENTS

| | | | | |
|---|---|---|---|---|
| JP | S52149232 | | 12/1977 | ............. B24C 1/00 |
| JP | 1-158853 | | 11/1989 | ............. F16J 15/34 |
| JP | H01158853 | | 11/1989 | ............. F16J 15/34 |
| JP | 09133222 | A * | 5/1997 | |
| JP | 9-292033 | | 11/1997 | ............. F16J 15/34 |
| JP | 11230364 | A * | 8/1999 | |
| JP | 11230365 | A * | 8/1999 | |
| JP | 11236976 | A * | 8/1999 | |
| JP | 11-287329 | | 10/1999 | ............. F16J 15/34 |
| JP | H11287329 | | 10/1999 | ............. F16J 15/34 |
| JP | 2000-169266 | | 6/2000 | ............. F16J 15/34 |
| JP | 2000169266 | | 6/2000 | ............. C04B 41/87 |
| WO | WO 02/093046 | | 11/2002 | ............. F16J 15/34 |
| WO | WO 2007/058177 | | 5/2007 | ............. F16J 15/34 |

OTHER PUBLICATIONS

English translation of International Search Report issued in PCT/JP2014/073136 dated Dec. 9, 2014 (2 pgs).
Chinese Office Action issued in application No. 201480038978.5, dated Jul. 27, 2016 (13 pgs).
Chinese Office Action issued in application No. 201480038978.5 dated Mar. 17, 2017 with English Translation (10 pgs).

* cited by examiner (a)

(b)

(c)

SLIDING PARTS

TECHNICAL FIELD

The present invention relates to sliding parts suitable for a mechanical seal, a bearing, and other sliding portions for example. In particular, the present invention relates to sliding parts such as a sealing ring or a bearing in which a fluid lies on sealing faces to reduce friction and there is a need for preventing fluid leakage from the sealing faces.

BACKGROUND ART

In order to maintain a sealing property for a long time in a mechanical seal serving as one example of sliding parts, contradictory conditions of "sealing" and "lubricity" have to be met at the same time. In recent years especially, there has been an even greater demand for lower friction in order to reduce mechanical loss while preventing leakage of a sealed fluid for environmental measures or the like. Lower friction is to be realized by applying various texturing to a sealing face. For example, there is a known method of arranging dimples on a sealing face as one of the texturing.

For example, in the invention described in JP 11-287329 A (hereinafter, referred to as "Patent Citation 1"), by forming a large number of dimples having different depth on a sealing face, a load capacity due to a fluid bearing pressure generated in a fluid lying between the sealing face and the opposing sealing face at the time of sliding is decreased at part of the dimples in accordance with a change in a fluid temperature but increased at the other dimples. Thus, the load capacity is stabilized and an effect of always maintaining a preferable sliding property can be obtained irrespective of a temperature change.

In the invention described in JP 2000-169266 A (hereinafter, referred to as "Patent Citation 2"), by forming a sealing face by depositing a hard film on a surface of a base member made of a sintered ceramic material and providing a large number of dimples on this sealing face, wear resistance is improved and a liquid lubricating property by the dimples is improved.

CITATION LIST

Patent Literature

Patent Citation 1: JP 11-287329 A
Patent Citation 2: JP 2000-169266 A

SUMMARY OF INVENTION

Technical Problem

However, the invention described in Patent Citation 1 focuses on the depth of the dimples provided on the sealing face for always maintaining a preferable sliding property irrespective of the temperature change but an influence of opening diameters of the dimples on a sliding characteristic (reduction in friction coefficient) has not yet been examined.

The invention described in Patent Citation 2 is to improve the liquid lubricating property by providing the dimples on the sealing face. However, as well as Patent Citation 1, an influence of opening diameters of the dimples on a sliding characteristic (reduction in friction coefficient) has not yet been examined.

An objective of the present invention is to provide sliding parts capable of improving a sliding characteristic in a wide range of a bearing characteristic number on a sealing face by randomly arranging dimples provided on the sealing face.

Solution to Problem

In order to achieve the foregoing objective, a first aspect of the present invention is a pair of sliding parts in which a plurality of dimples is arranged on at least one of sealing faces that relatively slide on each other characterized in that each of the plurality of dimples is provided independently from the other dimples, and arranged in such a manner that the plurality of dimples having different diameters is randomly distributed.

According to the first aspect, in the wide range of the bearing characteristic number on the sealing face, the sliding characteristic can be improved, that is, the friction coefficient can be reduced.

A second aspect of the sliding parts of the present invention relates to the first aspect, characterized in that the opening diameters of the plurality of dimples are set within a range from 30 to 100 µm.

According to the second aspect, in the wide range of the bearing characteristic number on the sealing face, the sliding characteristic can be furthermore improved.

A third aspect of the sliding parts of the present invention relates to the first or second aspect, characterized in that depth of the plurality of dimples is set within a range from 50 to 1,000 nm.

According to the third aspect, the friction coefficient on the sealing face can be reduced.

A fourth aspect of the sliding parts of the present invention relates to any of the first to third aspects, characterized in that the depth of the plurality of dimples is set within a range from 100 to 200 nm.

According to the fourth aspect, the sliding characteristic at extremely low speed on the sealing face can become preferable.

A fifth aspect of the sliding parts of the present invention relates to any of the first to fourth aspects, characterized in that an area ratio of the plurality of dimples relative to the sealing face is 30 to 50%.

According to the fifth aspect, sealing and lubricity on the sealing face can be obtained at the same time.

Advantageous Effects of Invention

The present invention exhibits the following superior effects.

(1) Since each of the plurality of dimples is provided independently from the other dimples, and arranged in such a manner that the plurality of dimples having different diameters is randomly distributed, the sliding characteristic can be improved in the wide range of the bearing characteristic number on the sealing face.

(2) Since the opening diameters of the plurality of dimples are set within a range from 30 to 100 µm, the sliding characteristic can be furthermore improved in the wide range of the bearing characteristic number on the sealing face.

(3) Since the depth of the plurality of dimples is set within a range from 50 to 1,000 nm, the friction coefficient on the sealing face can be reduced.

(4) Since the depth of the plurality of dimples is set within a range from 100 to 200 nm, the sliding characteristic at extremely low speed on the sealing face can become preferable.

(5) Since the area ratio of the plurality of dimples relative to the sealing face is 30 to 50%, the sealing and the lubricity on the sealing face can be obtained at the same time.

BRIEF DESCRIPTION OF DRAWINGS

FIG. 1(a) is a plan view of the sealing face; FIG. 1(b) is an A-A sectional view; and FIG. 1(c) is a B-B sectional view;

DESCRIPTION OF EMBODIMENTS

Hereinafter, with reference to the drawings, a mode for carrying out the present invention will be described and exemplified based on an embodiment. However, regarding size, material, shape, and relative arrangement of constituent parts described in the embodiment, and the like, there is no intention to limit the scope of the present invention only to those unless specifically and clearly described.

EMBODIMENT

With reference to FIGS. 1 to 5, a sliding part according to the embodiment of the present invention will be described.

As shown in FIG. 1(a), a sliding part 1 is formed in an annular body. In general, a high pressure sealed fluid exists on one side of inner and outer peripheries of a sealing face S of the sliding part 1, and the atmosphere is on the other side.

This sealed fluid can be effectively sealed by using the sliding part 1. For example, this sliding part 1 is used for at least one of a pair of rotating and stationary sealing rings in a mechanical seal device. By closely placing a sealing face of the rotating sealing ring and the opposing sealing face of the stationary sealing ring, a sealed fluid that exists in one of inner and outer peripheries of the sealing faces is sealed.

The sliding part can also be utilized as a sliding part of a bearing that slides on a rotating shaft while sealing lubricating oil on one side in the axial direction of a cylindrical sealing face.

Figure 1:
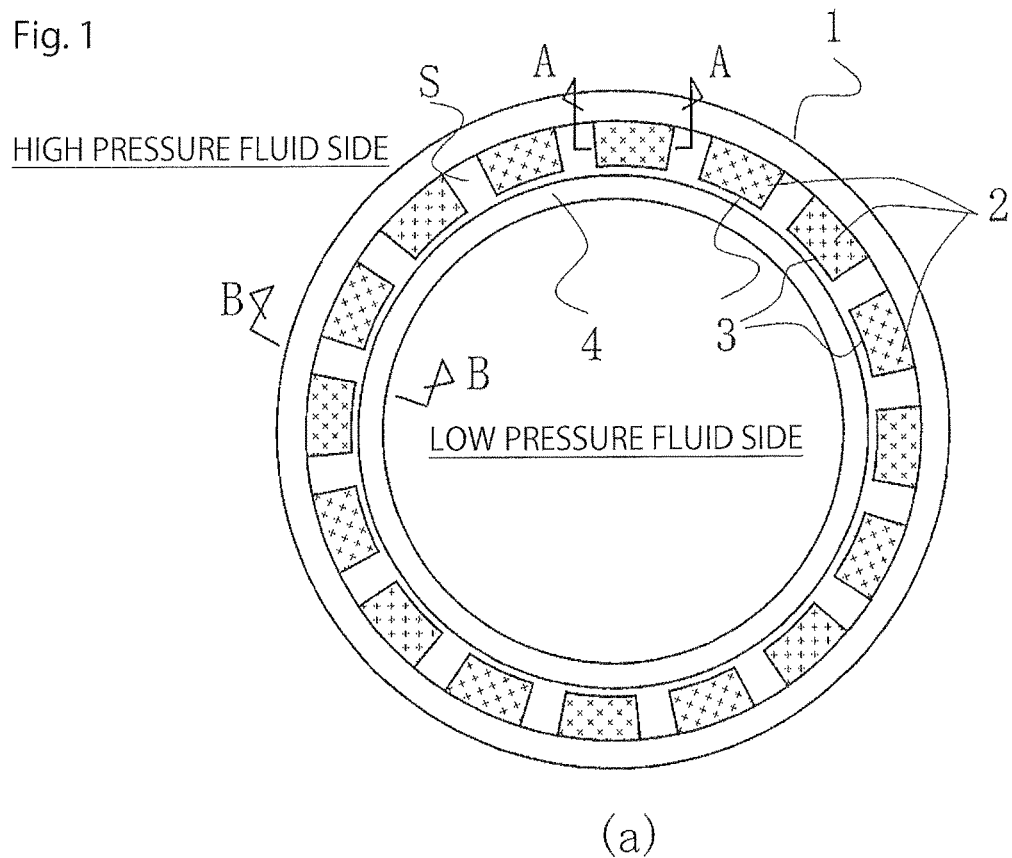
FIG. 1 is to illustrate one example of a sealing face of a sliding part according to an embodiment of the present invention.
Figure 1:
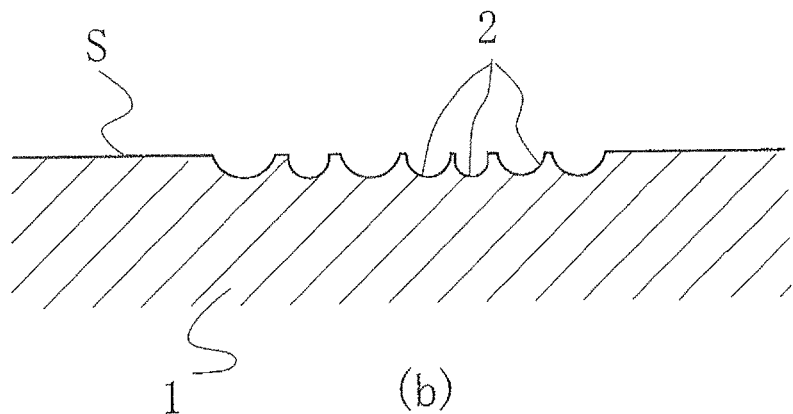
Figure 1:
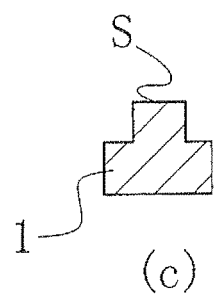

In the present example, a mechanical seal serving as one example of the sliding part will be described as an example. In the description, an outer peripheral side of the sliding part that forms the mechanical seal serves as a high pressure fluid side (sealed fluid side), and an inner peripheral side serves as a low pressure fluid side (atmosphere side). However, the present invention is not limited to this but can also be applied to a case where the high pressure fluid side and the low pressure fluid side are set the other way around. In FIG. 1, for convenience of description, a case where the high pressure sealed fluid exists on the outer peripheral side will be described.

In the example shown in the figures, a sectional shape of the sliding part 1 is a convex shape as shown in FIG. 1(c), and a top face thereof forms the flat sealing face S. A large number of dimples 2 as shown in FIG. 1(b) are independently provided on this sealing face S. These dimples 2 are provided not over the entire width in the radial direction of the sealing face S but in dimple formation regions 3 close to the high pressure fluid side. The dimple formation regions 3 communicate with the high pressure fluid side and are isolated from the low pressure fluid side by a flat seal face 4.

In the present example, the case where the dimples 2 are provided in the dimple formation regions 3 arranged equally and independently in the circumferential direction is shown. However, the present invention is not limited to this but the dimples may be provided continuously in the circumferential direction. In the present example, the sliding part 1 is made of silicon carbide (SiC).

In the present invention, the "dimples" are dents formed on the flat sealing face S, and a shape thereof is not particularly limited. For example, a planar shape of the dents includes various shapes such as a circular shape, an oval shape, an oblong shape, or a polygonal shape, and a sectional shape of the dents also includes various shapes such as a bowl shape or a square shape.

A large number of dimples 2 formed on the sealing face S have a function of holding part of a liquid placed between this sealing face S and the opposing sealing face that relatively slides on the above sealing face as a hydrodynamic lubricating liquid film so as to stabilize a lubricating liquid film.

Figure 2:
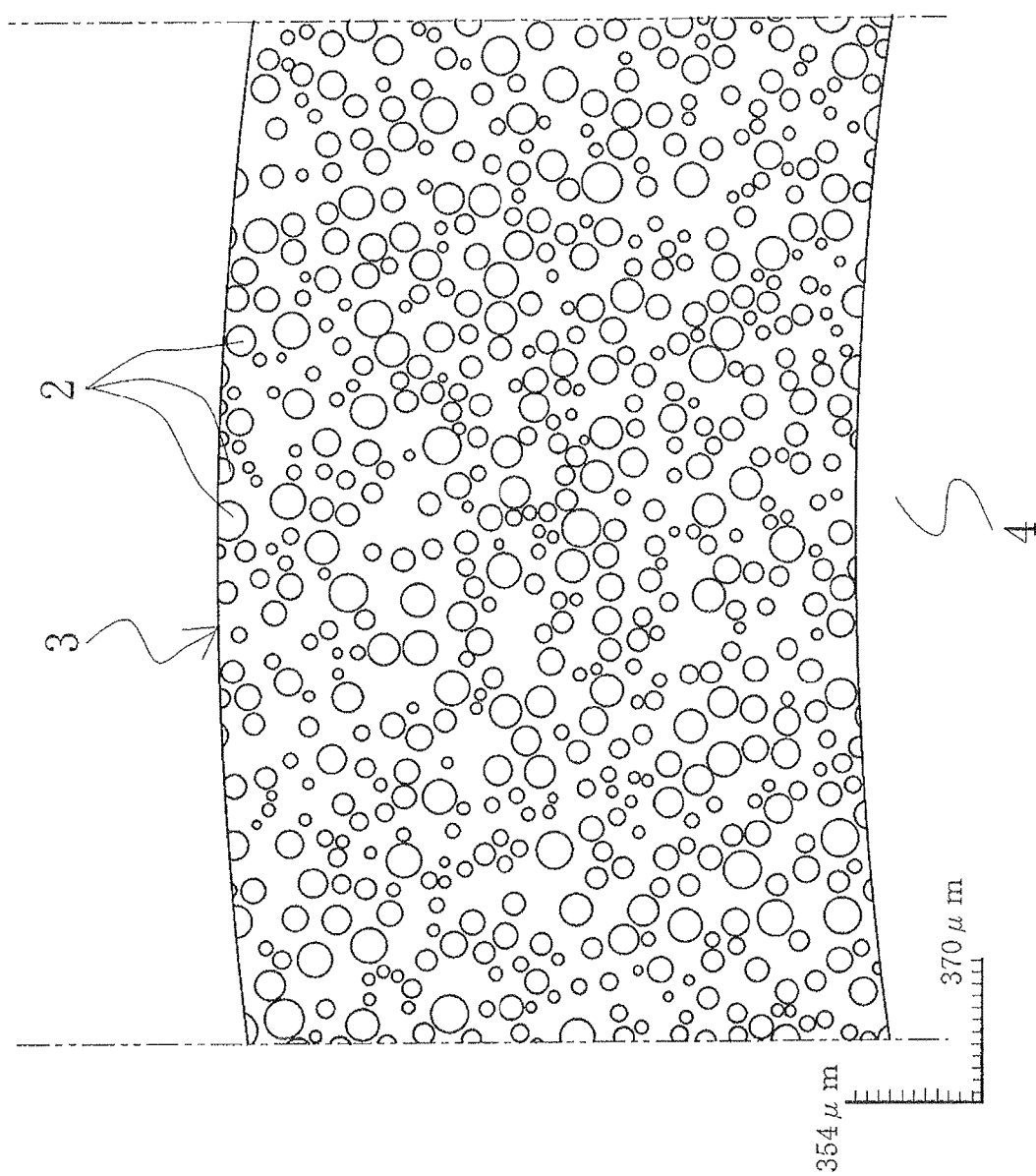
FIG. 2 is a plan view of the sealing face showing dimples randomly arranged on the sealing face of the sliding part according to the embodiment of the present invention.

FIG. 2 is a plan view of the sealing face showing the dimples randomly arranged on the sealing face of the sliding part according to the embodiment of the present invention. In FIG. 2, the same reference signs as the reference signs in FIG. 1 denote the same members as those in FIG. 1 and detailed description thereof will be omitted.

In FIG. 2, each of the plurality of dimples 2 formed on the sealing face is provided independently from the other dimples, and arranged in such a manner that the plurality of dimples having different opening diameters is randomly distributed. As a method of random distribution of the opening diameters of the dimples, in the present example, decision is made by using random numbers and the dimples are uniformly distributed on the sealing face. That is, setting is made in such a manner that the distribution of the dimples having different opening diameters is uniform over the entire sealing face.

One example of a method of processing the dimples on the sealing face will be described as follows.

(1) Decide diameters and positions of holes formed on a metal mask by using random numbers.

(2) Form holes on the metal mask by means of laser processing according to the decided diameters and positions.

(3) Install the metal mask in which the holes are randomly formed on the sealing face of the target sliding part.

(4) Form the dimples on the sealing face by utilizing the holes of the metal mask by irradiation with a femtosecond laser from the upper side of the metal mask, ion etching, or the like. The dimples having different opening diameters are uniformly arranged on the sealing face in predetermined distribution.

Figure 3:
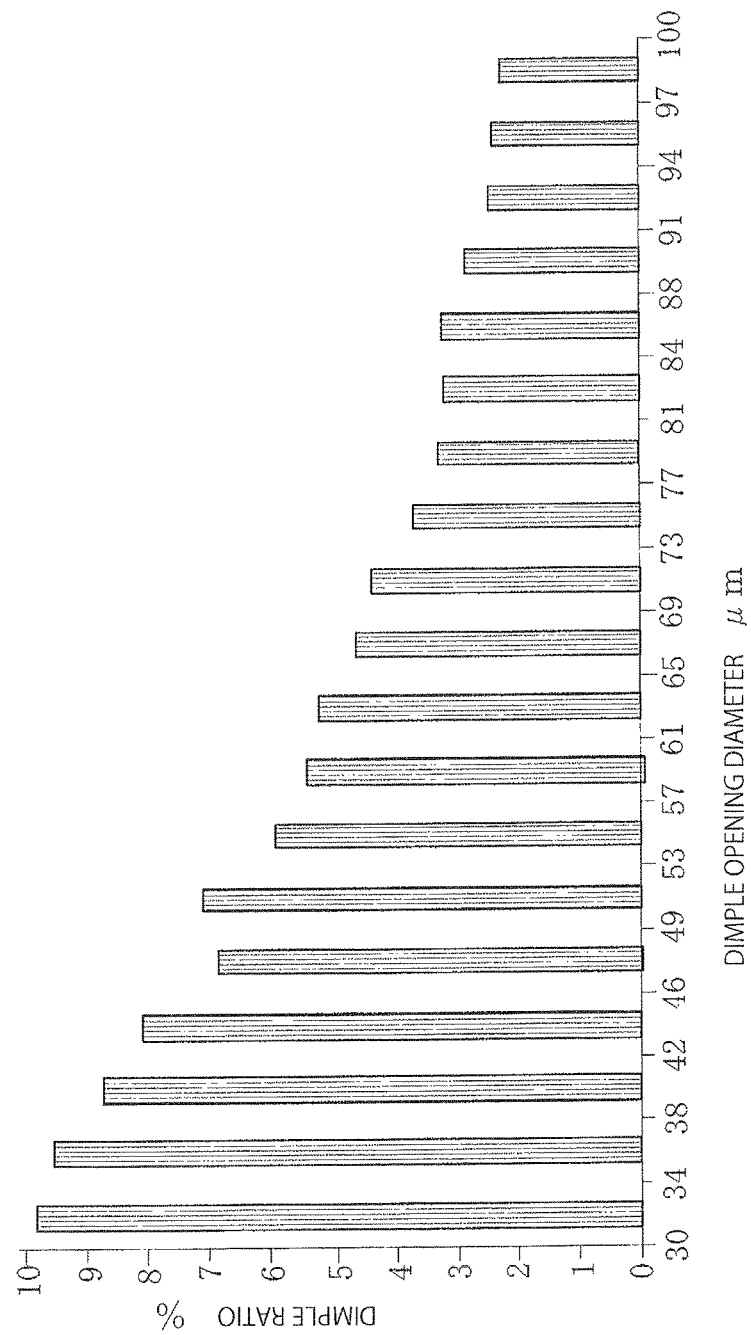
FIG. 3 is a chart showing diameter size distribution of the randomly arranged dimples according to the embodiment of the present invention.

FIG. 3 is a chart showing diameter size distribution of the randomly arranged dimples 2 according to the embodiment of the present invention.

In the present example, the opening diameters of the plurality of dimples 2 are distributed within a range from 30 to 100 μm. More dimples 2 having smaller opening diameters are distributed in comparison to the dimples 2 having larger opening diameters.

Random distribution of the opening diameters of the plurality of dimples 2 is set in accordance with a bearing characteristic number G (fluid viscosity×speed/load) of the sealing face or the like. FIG. 3 shows one favorable example in the mixed dimples having the opening diameters of 30 to 100 μm.

Specifications of sliding parts used in the embodiment and a comparative example are shown in Table 1 below.

In the embodiment, the mixed dimples in which the opening diameters of the dimples 2 are randomly distributed within a range from 30 to 100 μm are used.

In the comparative example, single dimples in which the opening diameters of the dimples 2 of three types including 50 μm, 75 μm, and 100 μm are uniformly distributed on the sealing face are used.

Further, 100 nm is adopted as depth of the plurality of dimples 2 in both the embodiment and the comparative example since a sliding characteristic at extremely low speed is preferable.

It should be noted that the depth of the plurality of dimples 2 is preferably set within a range from 50 to 100 nm from a viewpoint of reduction in a friction coefficient. However, in a case where importance is attached to the sliding characteristic at extremely low speed, the depth is preferably set within a range from 100 to 200 nm.

In order to obtain both sealing and lubricity at the same time, 40% is adopted as an area ratio of the plurality of dimples relative to the sealing face. However, the present invention is not limited to this but the area ratio may be 30 to 50%.

TABLE 1

|  | Example | Comparative Example |
|---|---|---|
| Inner diameter of sealing face | ϕ 18 mm | ϕ 18 mm |
| Width of sealing face | 1.8 mm | 1.8 mm |
| Dimple area ratio | 40% | 40% |
| Dimple opening diameter | ϕ 30 to 100 μm mixed | ϕ 50 μm, ϕ 75 μm, ϕ 100 μm |
| Dimple depth | 100 nm | 100 nm |

Test conditions of the embodiment and the comparative example are shown in Table 2 below.

TABLE 2

| Sliding material combination | SiC (dimple processing) × SiC (no processing) |
|---|---|
| Attachment load | 25N |
| Peripheral speed | 0.0 m/sec → 10.0 m/sec |
| Pressure | 0.15 MPaG (outer peripheral side) |
| Temperature | 60° C. |
| Sealed fluid | JIS K2234LLC 50% water solution |

Figure 4:
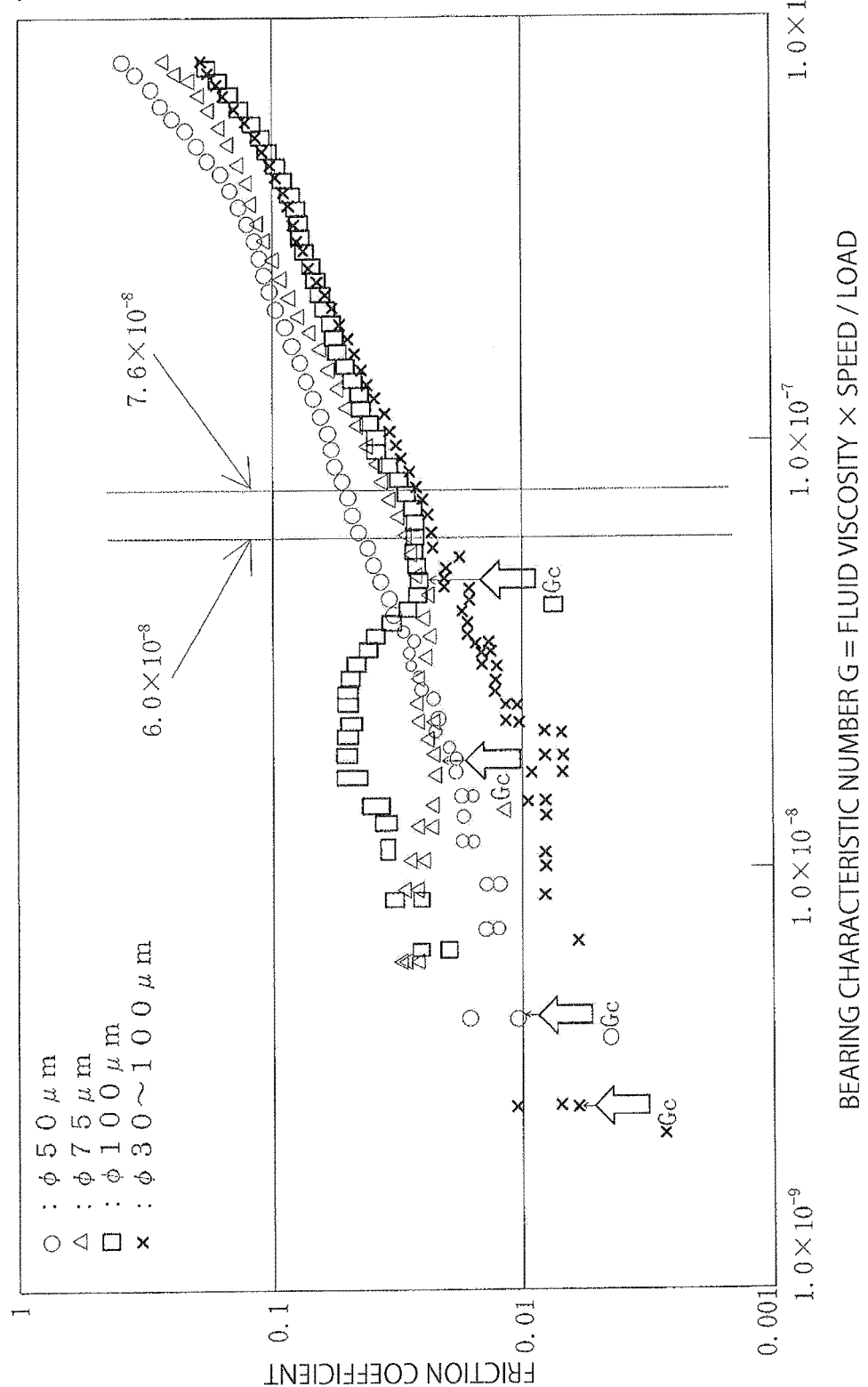
FIG. 4 is a chart showing a relationship between a friction coefficient and a bearing characteristic number G obtained by a rotation sliding test.

FIG. 4 is a chart showing a relationship between the friction coefficient and the bearing characteristic number G obtained by a rotation sliding test.

In FIG. 4, in a rotation number range in the test, in the comparative example in which the opening diameters of the dimples are ϕ50 μm, ϕ75 μm, ϕ100 μm, it is found that within a range where a value of the bearing characteristic number G exceeds $7.6 \times 10^{-8}$, the greater the opening diameters of the dimples are, the more the friction coefficient is lowered. A fluid lubricity transition point (hereinafter, referred to as the "Gc point") exists for each of the opening diameters of the dimples. In the comparative example of ϕ50 μm, ϕ75 μm, ϕ100 μm, it is found that the smaller the opening diameters of the dimples are, the more the Gc point is shifted to the lower G side and further the more the friction coefficient at the Gc point is lowered.

In the embodiment in which the opening diameters of the dimples are mixed from ϕ30 to 100 μm, within a range where the G value exceeds about $6.0 \times 10^{-8}$, the friction coefficient is almost the same as that of the diameter of ϕ100 μm, and within a range of $6.0 \times 10^{-8}$ or less, the Gc point is shifted to the lower G side and further the friction coefficient at the Gc point is lowered. It is found that there is an effect on the reduction in the friction coefficient in a wide rotation number range.

It should be noted that during the test, no leakage from the sealing face is generated in the present test.

Figure 5:
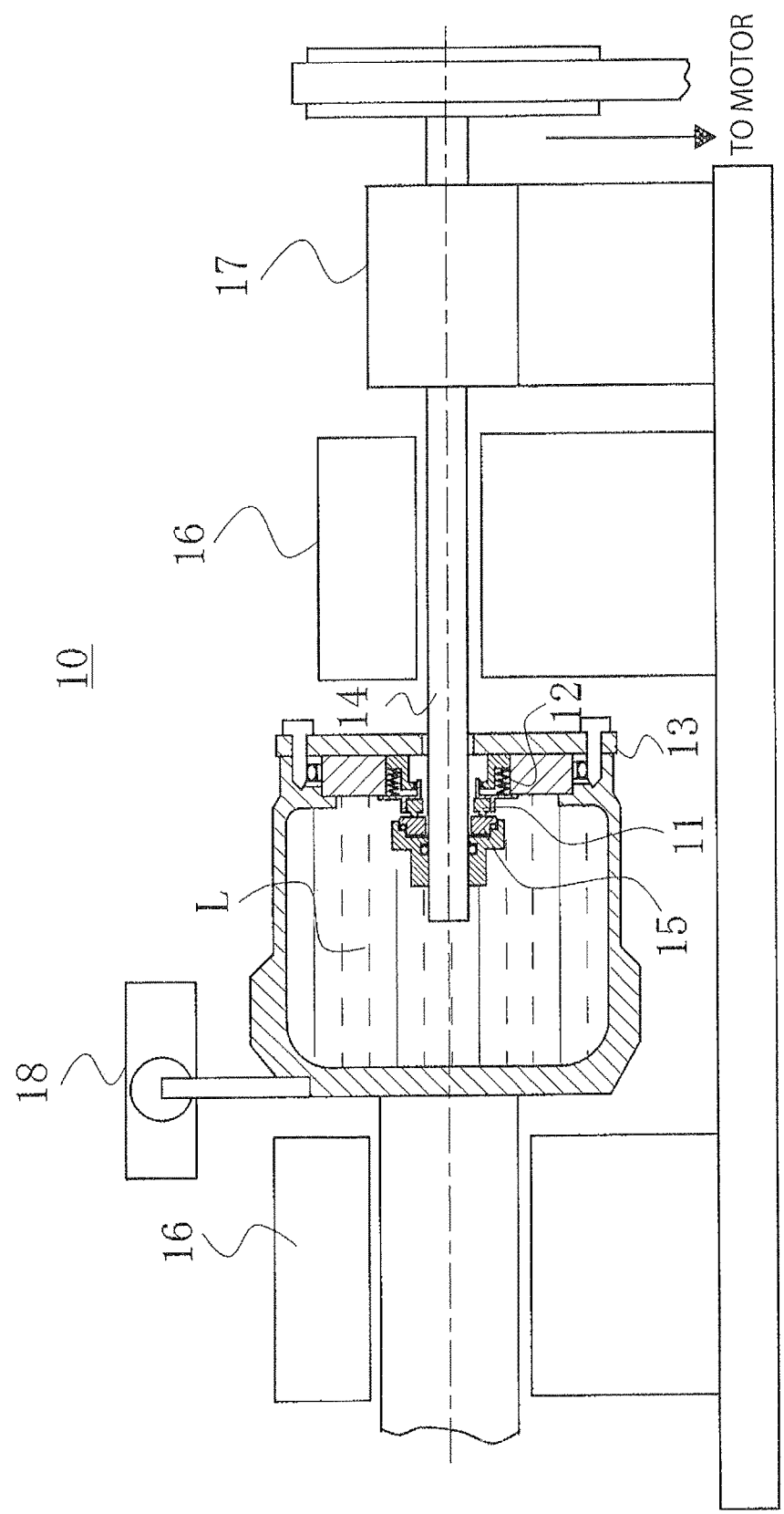
FIG. 5 is a schematic sectional view for illustrating a testing machine capable of measuring sliding torque, the testing machine used in the present test.

Next, with reference to FIG. 5, a testing machine 10 capable of measuring sliding torque, the testing machine used in the present test will be described.

A main body part of the testing machine 10 includes a casing 13 that supports a stationary ring 11 in a non-rotation state via a spring 12, a rotating shaft 14 rotatably inserted in an inner periphery of this casing 13, and a rotating ring 15 supported on an outer periphery of this rotating shaft 14, the rotating ring facing the stationary ring 11 in the axial direction. A sealing target liquid L is enclosed into a sealed space surrounded by the rotating ring 15, the casing 13, and the rotating shaft 14.

As a characteristic of the present testing machine 10, hydrostatic gas bearings are adopted as bearing parts 16 on both sides, so that the sliding torque of the mechanical seal can be measured with high precision. The torque is measured by two kinds of methods including a torque meter 17 and a cantilever type load cell 18, so as to eliminate measuring errors by double-checking.

Operations and effects of the sliding part according to the embodiment of the present invention are as follows.

(1) In the rotation number range in the test, the comparative example in which the opening diameters of the dimples are ϕ50 μm, ϕ75 μm, ϕ100 μm has a tendency that within a range where the value of the bearing characteristic number G exceeds $7.6 \times 10^{-8}$, the greater the opening diameters of the dimples are, the more the friction coefficient is lowered, and the smaller the opening diameters of the dimples are, the more the fluid lubricity transition point (hereinafter, referred to as the "Gc point") is shifted to the lower G side and further the more the friction coefficient at the Gc point is lowered. Meanwhile, in the embodiment in which the opening diameters of the dimples are mixed from ϕ30 to 100 μm, within a range where the G value exceeds about $6.0 \times 10^{-8}$, the friction coefficient is almost the same as that of the diameter of ϕ100 μm, and within a range of $6.0 \times 10^{-8}$ or less, the Gc point is shifted to the lower G side and further the friction coefficient at the Gc point is lowered. There is an effect on the reduction in the friction coefficient in a wide rotation number range.

(2) The depth of the plurality of dimples 2 is preferably set within a range from 50 to 1,000 nm from a viewpoint of the reduction in the friction coefficient. However, by setting the depth within a range from 100 to 200 nm, the sliding characteristic at extremely low speed can become preferable.

(3) By setting the area ratio of the plurality of dimples relative to the sealing face within a range from 30 to 50%, the sealing and the lubricity can be obtained at the same time.

The mode of the present invention is described with the above embodiment. However, specific configurations are not limited to these modes of the embodiment but modifications and additions within a range not departing from the gist of the present invention are also included in the present invention.

For example, the example that the sliding part is used for at least one of the pair of rotating and stationary sealing rings in the mechanical seal device is described in the above embodiment. However, the sliding part can also be utilized as a sliding part of a bearing that slides on a rotating shaft while sealing lubricating oil on one side in the axial direction of a cylindrical sealing face.

For example, the case where the high pressure sealed fluid exists on the outer peripheral side is described in the above embodiment. However, the present invention can also be applied to a case where the high pressure fluid exists on the inner peripheral side. In that case, the dimples are arranged to communicate with the inner peripheral side.

For example, the case where the opening diameters of the plurality of dimples are set within a range from 30 to 100 µm and more dimples having smaller opening diameters are distributed in comparison to the dimples having larger opening diameters is described in the above embodiment. However, these show one preferable example and the present invention is not limited to these. It is important to randomly distribute and mix the plurality of dimples having different opening diameters. A ratio of the distribution may be set to the most relevant value in accordance with the bearing characteristic number G (fluid viscosity×speed/load) of the sealing face.

For example, the case where 100 nm is adopted as the depth of the plurality of dimples is described in the above embodiment. However, the present invention is not limited to this. The depth may be selected from a range from 50 to 1,000 nm. In order to make the sliding characteristic at extremely low speed become preferable, the depth is desirably set within a range from 100 to 200 nm.

For example, the case where 40% is adopted as the area ratio of the plurality of dimples relative to the sealing face from a viewpoint to obtain both the sealing and the lubricity at the same time is described in the above embodiment. However, the present invention is not limited to this but the area ratio may be set within a range from 30 to 50%.

REFERENCE SIGNS LIST

1 Sliding part
2 Dimple
3 Dimple formation region
4 Seal face
10 Testing machine
11 Stationary ring
12 Spring
13 Casing
14 Rotating shaft
15 Rotating ring
16 Bearing part
17 Torque meter
18 Load cell
S Sealing face

The invention claimed is:

1. A pair of sliding parts respectively having sealing faces that slide relative to each other for sealing a sealed fluid that exists in inner or outer peripheries of the sealing faces, each of the sealing faces being a flat surface, wherein:
a plurality of dimples is arranged in a dimple formation region defined on at least one of sealing faces, the dimple formation region communicating with a high pressure fluid side and being isolated from a low pressure fluid side by only a flat surface portion of the sealing face, and, wherein:
at least some of the dimples have different opening diameters, each of the plurality of dimples being isolated from the other dimples by the sealing face in such a manner that the flat surface exists between adjoining dimples, the dimples being arranged in such a manner that the plurality of dimples having different opening diameters is randomly distributed.

2. The sliding parts as set forth in claim 1, wherein:
the opening diameters of the plurality of dimples are set within a range from 30 to 100 µm.

3. The sliding parts as set forth in claim 1, wherein:
depth of the plurality of dimples is set within a range from 50 to 1,000 nm.

4. The sliding parts as set forth in claim 1, wherein:
the depth of the plurality of dimples is set within a range from 100 to 200 nm.

5. The sliding parts as set forth in claim 1, wherein:
an area ratio of the plurality of dimples relative to the sealing face is 30 to 50%.

6. The sliding parts as set forth in claim 1, wherein:
a plurality of the dimple formation regions are defined on the sealing face, and the dimple formation regions are arranged so that the flat surface exists between adjoining two of the dimple formation regions.

7. The sliding parts as set forth in claim 2, wherein:
the dimple formation regions are aligned in a circumferential direction.

8. The sliding parts as set forth in claim 1, wherein:
some of the dimples adjacent to the high pressure fluid side are opened at a circumferential surface of the sliding part to directly communicate with the high pressure fluid side.

9. The sliding parts as set forth in claim 1, wherein:
more of the dimples having smaller opening diameters are distributed in comparison to the dimples having larger opening diameters.

* * * * *